US012775628B2

(12) United States Patent
Ballantyne

(10) Patent No.: US 12,775,628 B2
(45) Date of Patent: Oct. 27, 2026

(54) TRANSFORMATION OF TIME-BASED EVENT DATA STRUCTURES TO LOGARITHMIC TIME SCALE

(71) Applicant: Dell Products L.P., Round Rock, TX (US)

(72) Inventor: Robert A. Ballantyne, Mansfield, MA (US)

(73) Assignee: Dell Products L.P., Round Rock, TX (US)

( * ) Notice: Subject to any disclaimer, the term of this patent is extended or adjusted under 35 U.S.C. 154(b) by 85 days.

(21) Appl. No.: 18/619,365

(22) Filed: Mar. 28, 2024

(65) Prior Publication Data

US 2025/0307259 A1 Oct. 2, 2025

(51) Int. Cl.
*G06F 16/2458* (2019.01)
*G06F 16/25* (2019.01)

(52) U.S. Cl.
CPC ........ *G06F 16/2477* (2019.01); *G06F 16/258* (2019.01)

(58) Field of Classification Search
CPC ........................... G06F 16/2477; G06F 16/258
See application file for complete search history.

(56) References Cited

U.S. PATENT DOCUMENTS 9,009,732 B2 * 4/2015 Schiefer ............ G06F 16/24564 719/331
11,989,096 B2 * 5/2024 MacLean ............ G06F 11/1451
2015/0370493 A1 * 12/2015 Choi ..................... G06F 3/0659 711/103
2022/0229808 A1 * 7/2022 Miller ..................... G06F 11/30

OTHER PUBLICATIONS

"Convert Linear Scale to Logarithmic"; https://stackoverflow.com/questions/19472747/convert-linear-scale-to-logarithmic; downloaded on Mar. 26, 2024.
"Convert a Linear Scale to a Logarithmic Scale"; https://math.stackexchange.com/questions/970094/convert-a-linear-scale-to-a-logarithmic-scale; downloaded on Mar. 26, 2024.
"Linear to Log Conversion"; https://dsplog.com/2008/11/20/linear-to-log-conversion/; downloaded on Mar. 26, 2024.

* cited by examiner

*Primary Examiner* — Cheyne D Ly
(74) *Attorney, Agent, or Firm* — Ryan, Mason & Lewis, LLP

(57) ABSTRACT

Techniques are provided for transformation of time-based event data structures to a logarithmic time scale. One method comprises obtaining time-based event data structures associated with respective events, where a given time-based event data structure, associated with a given event, comprises multiple data elements comprising an event base date and an event identifier; converting the time-based event data structures into a tabular format, where each record corresponds to a different event and each data element is assigned to a corresponding field in the corresponding record of the tabular format; determining an overall time duration associated with the events in the tabular format; determining a portion of the overall time duration allocated to each designated time unit in a logarithmic time scale; transforming the tabular format using the determined portions; and initiating an automated action using the transformed tabular format.

20 Claims, 10 Drawing Sheets

300

TIME-BASED EVENT DATA PRE-PROCESSING

1. CONVERT RELATED TIME-BASED EVENT DATA STRUCTURES TO A TABULAR FORMAT, WHERE EACH RECORD CORRESPONDS TO A DIFFERENT EVENT;

2. ASSIGN EACH EVENT DATA ELEMENT OF A GIVEN TIME-BASED EVENT DATA STRUCTURE TO A CORRESPONDING FIELD IN A CORRESPONDING RECORD OF A TABLE; AND

3. ASSIGN EACH SUB-EVENT DATA ELEMENT, IF ANY, OF THE GIVEN TIME-BASED EVENT DATA STRUCTURE TO ADDITIONAL FIELDS IN THE CORRESPONDING RECORD OF THE TABLE

FIG. 3

400

TIME-BASED EVENT TABLE NORMALIZATION PROCESS

1. INSERT ZERO OR MORE DUPLICATE RECORDS FOR EACH EVENT IN THE TABLE OF FIG. 3, WHERE EACH RECORD CORRESPONDS TO A DESIGNATED TIME UNIT (E.G., ONE YEAR), SUCH THAT A TIME ASSOCIATED WITH A TOTAL NUMBER OF RECORDS FOR A GIVEN EVENT CORRESPONDS TO AN EVENT DURATION OF THE GIVEN EVENT;

2. TRANSPOSE THE TABLE SO THAT EACH FIELD REPRESENTS A DURATION CORRESPONDING TO THE DESIGNATED TIME UNIT AND EACH RECORD REPRESENTS A CORRESPONDING EVENT OR SUB-EVENT DATA ELEMENT OF THE GIVEN TIME-BASED EVENT DATA STRUCTURE; AND

3. COMBINE CONTIGUOUS DUPLICATE FIELDS INTO A SINGLE ENTRY THAT SPANS A TIME PERIOD CORRESPONDING TO AN ASSOCIATED EVENT

FIG. 4

500

LOGARITHMIC TIME SCALE VISUALIZATION PROCESS

1. DETERMINE OVERALL TIME DURATION ASSOCIATED WITH TABLE;

2. USE OVERALL TIME DURATION TO DETERMINE PORTION OF TIME AXIS ALLOCATED TO EACH DESIGNATED TIME UNIT IN A LOGARITHMIC TIME SCALE;

3. CALCULATE WIDTH OF EACH FIELD (E.G., IN PIXELS) IN TRANSPOSED TABLE USING DETERMINED TIME AXIS PORTION ALLOCATED FOR EACH DESIGNATED TIME UNIT; AND

4. GENERATE LOGARITHMIC TIME SCALE VISUALIZATION

FIG. 5

TRANSFORMATION OF TIME-BASED EVENT DATA STRUCTURES TO LOGARITHMIC TIME SCALE

BACKGROUND

A number of scenarios exist where historical event data is stored and processed. For example, some systems process data records associated with historical events, such as a user's health history, a user's work history or a user's academic history.

SUMMARY

Illustrative embodiments of the disclosure provide techniques for transformation of time-based event data structures to a logarithmic time scale. An exemplary method comprises obtaining a plurality of time-based event data structures associated with respective ones of a plurality of events, wherein a given time-based event data structure, associated with a given event, comprises a plurality of data elements, wherein the plurality of data elements comprises a base date of the given event and an identifier of the given event; converting the plurality of time-based event data structures into a tabular format, wherein each record in the tabular format corresponds to a different event of the plurality of events, wherein each data element of a particular time-based event data structure is assigned to a corresponding field in the corresponding record of the tabular format; determining an overall time duration associated with the plurality of events in the tabular format; determining a portion of the overall time duration allocated to each designated time unit in a logarithmic time scale; transforming the tabular format using the determined portion for each designated time unit; and initiating at least one automated action using the transformed tabular format.

Illustrative embodiments can provide significant advantages relative to conventional techniques for processing time-based data structures. For example, problems associated with processing data associated with time-based event data structures are overcome in one or more embodiments by transforming such time-based event data structures, associated with respective events, into a tabular format and determining a portion of the overall time duration allocated to each designated time unit in a logarithmic time scale.

These and other illustrative embodiments include, without limitation, methods, apparatus, networks, systems and processor-readable storage media.

BRIEF DESCRIPTION OF THE DRAWINGS

FIG. 3 is a process diagram illustrating an exemplary implementation of a process for time-based event data pre-processing in an illustrative embodiment;

FIG. 4 is a process diagram illustrating an exemplary implementation of a time-based event table normalization process in an illustrative embodiment;

FIG. 5 is a process diagram illustrating an exemplary implementation of a logarithmic time scale visualization process in an illustrative embodiment;

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

In one or more embodiments, the disclosed logarithmic time scale transformation techniques transform historical time-based event data structures associated with respective events into a logarithmic time scale that assigns a determined portion of an overall time duration to each designated time unit (e.g., one year) of interest. Among other benefits, the logarithmic time scale may be used to compactly display at least portions of time-based data over a range of values. In this manner, more recent events, which may be more relevant in at least some implementations, are emphasized over less recent events (e.g., more recent events may be presented using a larger portion of a time axis, relative to less recent events). Likewise, less recent events, which may be of less importance in such implementations, may be visually compressed relative to more recent events. Thus, a presentation of events may be weighted towards events that are more interesting and/or important to a viewer.

In some embodiments, the events used to illustrate the disclosed logarithmic time scale transformation techniques comprise historical events for one or more users (for example, historical events in a given category for the given user), such as a user's health history (e.g., in the form of a personal health record), a user's work history (e.g., in the form of a resume or a curriculum vitae) or a user's academic history (e.g., in the form of a transcript from one or more academic institutions). The term "time-based event data structure," as used herein, is intended to be broadly construed, so as to encompass numerous different types of data structures and other tabular arrangements that are utilized to store data associated with time-based events, as would be apparent to a person of ordinary skill in the art. The terms "base date" and "duration" with respect to a given event, as used herein, are intended to be broadly construed, so as to encompass numerous different ways of expressing a starting and ending timeframe of the given event, as would be apparent to a person of ordinary skill in the art.

Figure 1:
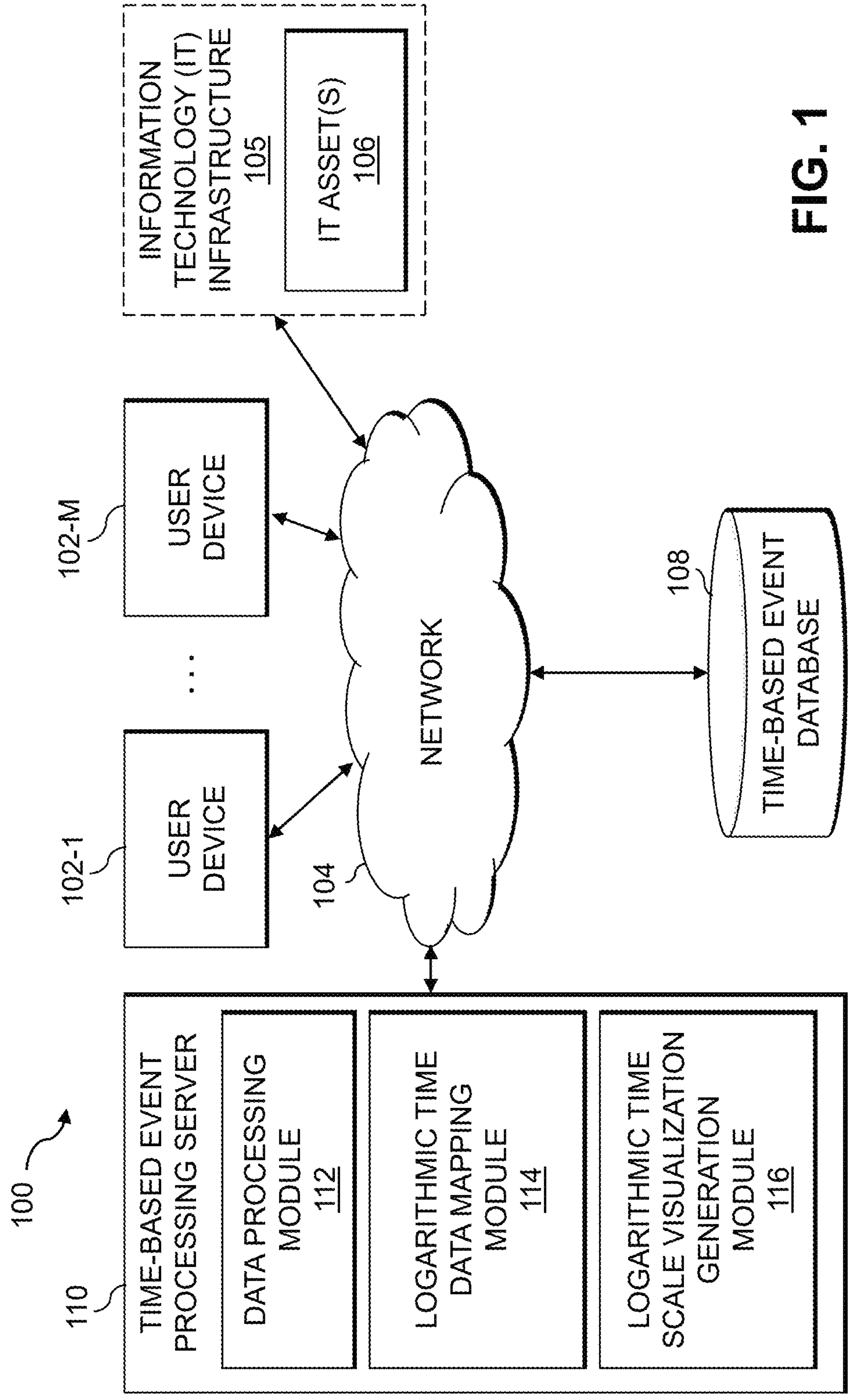
FIG. 1 is a block diagram of an information processing system configured for transformation of time-based event data structures to a logarithmic time scale in an illustrative embodiment.

FIG. 1 shows an information processing system 100 configured in accordance with an illustrative embodiment. The information processing system 100 is assumed to be built on at least one processing platform and provides functionality for transformation of time-based event data structures to a logarithmic time scale. The information processing system 100 includes a set of user devices 102-1 through 102-M (collectively, user devices 102) which are coupled to a network 104. Also coupled to the network 104 is an IT infrastructure 105 comprising one or more IT assets 106, one or more time-based event databases 108, and a time-based event processing server 110. The IT assets 106 may comprise physical and/or virtual computing resources in the IT infrastructure 105. Physical computing resources may include physical hardware such as servers, host devices, storage systems, networking equipment, Internet of Things (IoT) devices, other types of processing and computing devices including desktops, laptops, tablets, smartphones, etc. Virtual computing resources may include virtual machines (VMs), containers, etc.

The IT assets 106 of the IT infrastructure 105 may host software applications that are utilized by respective ones of the user devices 102, such as in accordance with a client-server computer program architecture. In some embodiments, the software applications comprise web applications designed for delivery from assets in the IT infrastructure 105 to users (e.g., of user devices 102) over the network 104. Various other examples are possible, such as where one or more software applications are used internal to the IT infrastructure 105 and not exposed to the user devices 102. It should be appreciated that, in some embodiments, some of the IT assets 106 of the IT infrastructure 105 may themselves be viewed as applications or more generally as software or hardware.

The user devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The user devices 102 may also or alternately comprise virtualized computing resources, such as VMs, containers, etc.

The user devices 102 in some embodiments comprise respective computers associated with a particular company, organization or other enterprise. Thus, the user devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

Although not explicitly shown in FIG. 1, one or more input-output devices such as keyboards, displays or other types of input-output devices may be used to support one or more user interfaces to the time-based event processing server 110, as well as to support communication between the time-based event processing server 110 and other related systems and devices not explicitly shown.

The user devices 102 are configured to access or otherwise utilize the IT infrastructure 105. In some embodiments, the user devices 102 are assumed to be associated with users that execute one or more software applications. In other embodiments, the user devices 102 are assumed to be associated with system administrators, IT managers or other authorized personnel responsible for managing the IT assets 106 of the IT infrastructure 105 (e.g., where such management includes configuring email accounts of one or more users). For example, a given one of the user devices 102 may be operated by a user to access a graphical user interface (GUI) provided by the time-based event processing server 110 to manage historical event data, for example. The time-based event processing server 110 may be provided as a cloud service that is accessible by the given user device 102 to allow the user thereof to process historical event data in accordance with the disclosed logarithmic time scale transformation techniques.

In some embodiments, the IT assets 106 of the IT infrastructure 105 are owned or operated by the same enterprise that operates the time-based event processing server 110 (e.g., where an enterprise such as a business provides support for the assets it operates). In other embodiments, the IT assets 106 of the IT infrastructure 105 may be owned or operated by one or more enterprises different than the enterprise which operates the time-based event processing server 110 (e.g., a first enterprise provides support for assets that are owned by multiple different customers, businesses, etc.). Various other examples are possible.

The time-based event processing server 110 in the FIG. 1 embodiment is assumed to be implemented using at least one processing device. Each such processing device generally comprises at least one processor and an associated memory, and implements one or more functional modules or logic for controlling certain features of the time-based event processing server 110. In the FIG. 1 embodiment, the time-based event processing server 110 comprises a data processing module 112, a logarithmic time data mapping module 114 and a logarithmic time scale visualization generation module 116. The data processing module 112 is configured to process time-based event data structures, as discussed further below in conjunction with FIG. 2, and to convert the time-based event data structures into a tabular format, as discussed further below in conjunction with FIG. 3. The logarithmic time data mapping module 114, discussed further below in conjunction with FIGS. 4 and 5, for example, is configured to determine an overall time duration associated with the events and a portion of the overall time duration allocated to each designated time unit (e.g., one year) in a logarithmic time scale. The logarithmic time scale visualization generation module 116 is configured in some embodiments to visualize the time-based event data using the portion of the overall time duration allocated to each designated time unit (e.g., as determined by the logarithmic time data mapping module 114).

In some embodiments, one or more of the storage systems utilized to implement the time-based event databases 108 comprise a scale-out all-flash content addressable storage array or other type of storage array. The time-based event databases 108 may store time-based event data structures associated with historical events and/or tabular formats of such time-based event data structures.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

An enterprise may subscribe to or otherwise utilize the time-based event processing server 110 to automatically implement the disclosed logarithmic time scale transformation techniques. As used herein, the term "enterprise system" is intended to be construed broadly to encompass any group of systems or other computing devices. For example, the IT assets 106 of the IT infrastructure 105 may provide a portion of one or more enterprise systems. A given enterprise system may also or alternatively include one or more of the user devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

It is to be appreciated that the particular arrangement of the user devices 102, the IT infrastructure 105 and the time-based event processing server 110 illustrated in the FIG. 1 embodiment is presented by way of example only, and alternative arrangements can be used in other embodiments. As discussed above, for example, the time-based event processing server 110 (or portions of components thereof, such as one or more of the data processing module 112, the logarithmic time data mapping module 114 and the logarithmic time scale visualization generation module 116) may in some embodiments be implemented internal to one or more of the user devices 102 and/or the IT infrastructure 105.

At least portions of the data processing module 112, the logarithmic time data mapping module 114 and the logarithmic time scale visualization generation module 116 may be implemented at least in part in the form of software that is stored in memory and executed by a processor.

The time-based event processing server 110 and other portions of the information processing system 100, as will be described in further detail below, may be part of cloud infrastructure.

The time-based event processing server 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The user devices 102, IT infrastructure 105, the time-based event databases 108 and the time-based event processing server 110 or components thereof (e.g., the data processing module 112, the logarithmic time data mapping module 114 and/or the logarithmic time scale visualization generation module 116) may be implemented on respective distinct processing platforms, although numerous other arrangements are possible. For example, in some embodiments at least portions of the time-based event processing server 110 and one or more of the user devices 102, the IT infrastructure 105 and/or the time-based event databases 108 are implemented on the same processing platform. A given client device (e.g., user device 102-1) can therefore be implemented at least in part within at least one processing platform that implements at least a portion of the time-based event processing server 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the user devices 102, the IT infrastructure 105, IT assets 106, the time-based event databases 108 and the time-based event processing server 110, or portions or components thereof, to reside in different data centers. Numerous other distributed implementations are possible. The time-based event processing server 110 can also be implemented in a distributed manner across multiple data centers.

Additional examples of processing platforms utilized to implement the time-based event processing server 110 and other components of the information processing system 100 in illustrative embodiments will be described in more detail below in conjunction with FIGS. 9 and 10.

It is to be appreciated that these and other features of illustrative embodiments are presented by way of example only and should not be construed as limiting in any way.

It is to be understood that the particular set of elements shown in FIG. 1 for transformation of time-based event data structures to a logarithmic time scale is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only and should not be construed as limiting in any way.

Figure 2:
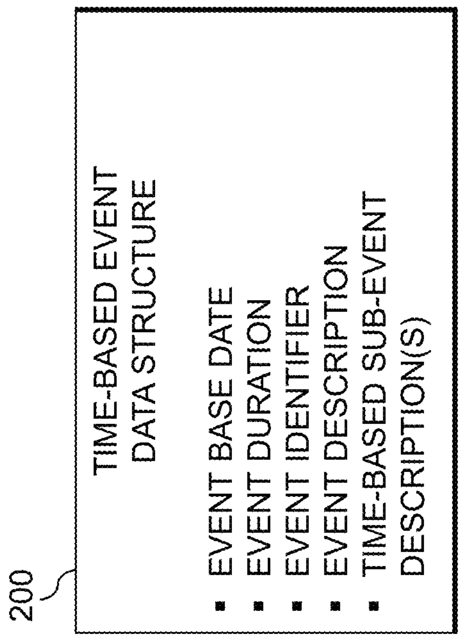
FIG. 2 illustrates an example of a time-based event data structure in an illustrative embodiment.

FIG. 2 illustrates an example of a time-based event data structure 200 in an illustrative embodiment. In the example of FIG. 2, the exemplary time-based event data structure 200 may be associated with a historical event for one or more users. As noted above, the historical event may be in a given category for a given user, such as a health event, a work event or an academic event. The exemplary time-based event data structure 200 comprises a plurality of representative data elements, such as an event base date data element, an event duration data element, an event identifier data element (e.g., an event name), an event description data element and zero or more time-based sub-event description data elements. The event base date and the event duration, collectively, define a starting and ending timeframe of the respective event. It is noted that the sub-events may have their own date ranges within the overall event duration.

A plurality of the time-based event data structures may be stored, in some embodiments, in a tabular format (e.g., arranged in a table, with rows and columns and/or records and fields, respectively). The disclosed logarithmic time scale transformation techniques may transform the tabular format of the time-based event data structures into a logarithmic time scale that assigns a determined portion of an overall time duration to each designated time unit (e.g., one year) of interest. In this manner, more recent events, which may be more relevant in at least some implementations, are emphasized over less recent events (and less recent events may be visually compressed, relative to the more recent events, in a visualization of the tabular format).

One or more aspects of the disclosure recognize that when the time-based event data structures correspond to a work history, e.g., in a reverse chronological order, the amount of insight provided by a textual representation of the time-based event data may depend on how much detail is provided, and how much time is taken by a reader to absorb the information provided. The disclosed logarithmic time scale transformation techniques provide a viewer greater insight into the historical experience being presented. In some embodiments, the disclosed transformation of time-based event data structures to a logarithmic time scale provides historical event information in a graphical form, using a logarithmic time scale, where older historical events are weighted against newer historical events, so that the older historical events are presented as being less important.

FIG. 3 is a process diagram illustrating an exemplary implementation of a process 300 for time-based event data pre-processing in an illustrative embodiment. As discussed hereinafter, the historical event information stored in each of the time-based event data structures 200 of FIG. 2 is first converted to a tabular format (e.g., a table) with the following fields corresponding to the data elements of the representative time-based event data structure 200 of FIG. 2: an event base date field, an event duration field, an event identifier field, an event description field, and zero or more time-based sub-event description fields.

In the example of FIG. 3, a plurality of time-based event data structures is initially converted to the tabular format in step 1, where each record (or row) corresponds to a different event. Each data element of a given time-based event data structure is assigned in step 2 to a corresponding field in the corresponding record of the table. In addition, each sub-event data element, if any, of the given time-based event data structure is assigned in step 3 to an additional field in the corresponding record of the generated table.

The table generated using the process 300 of FIG. 3 may be represented, for example, as a spreadsheet, a database, or a YAML/JSON text file.

FIG. 4 is a process diagram illustrating an exemplary implementation of a time-based event table normalization process 400 in an illustrative embodiment. In the example of FIG. 4, the table generated using the process 300 of FIG. 3 is normalized, for example, by adding zero or more records (e.g., rows), so that each record represents a designated time period (nominally, one year), where the added rows are duplicates of existing rows, at least in some embodiments. Thus, the process 400 initially inserts zero or more duplicate records for each event in the generated table in step 1, where each record corresponds to the designated time unit (e.g., one year), such that a time associated with a total number of records for a given event corresponds to an event duration of the corresponding event. For example, an event having an event duration of three years will span three records in the normalized table (with each record associated with a given event having identical or substantially duplicate information).

The process 400 then transposes the table in step 2 so that each field represents a duration corresponding to the designated time unit and each record represents a corresponding event or sub-event data element of the given time-based event data structure. In other words, the records (e.g., rows) of the table become fields (e.g., columns), representing the designated time unit, and the fields of the table become records. Thus, the records associated with each event comprise an event base date record, an event duration record, an event identifier record, an event description record, and zero or more time-based sub-event description records. It is noted that blank fields in the table remain blank for their associated time period. Contiguous duplicate fields may be combined in step 3 into a single entry that spans the time period corresponding to the associated event.

FIG. 5 is a process diagram illustrating an exemplary implementation of a logarithmic time scale visualization process 500 in an illustrative embodiment. In the example of FIG. 5, the logarithmic time scale visualization process 500 initially determines an overall time duration associated with the table in step 1 (e.g., by identifying the number of fields in the transposed table and multiplying by the designated time unit). The determined overall time duration is used in step 2 to determine a portion of the time axis allocated to each designated time unit in a logarithmic time scale, as discussed further below in conjunction with FIG. 6. The width of each field (e.g., in pixels) in the transposed table is calculated in step 3 using the determined time axis portion allocated for each designated time unit. In this manner, the overall event time duration is used to calculate the width of each field across the total width of the final visualization, such that events associated with a more recent timeframe (e.g., more recent years) are allocated more visual space in a visualization than events associated with a less recent timeframe.

Finally, the logarithmic time scale visualization process 500 generates a logarithmic time scale visualization in step 4, as discussed further below in conjunction with FIG. 7.

Figure 6:
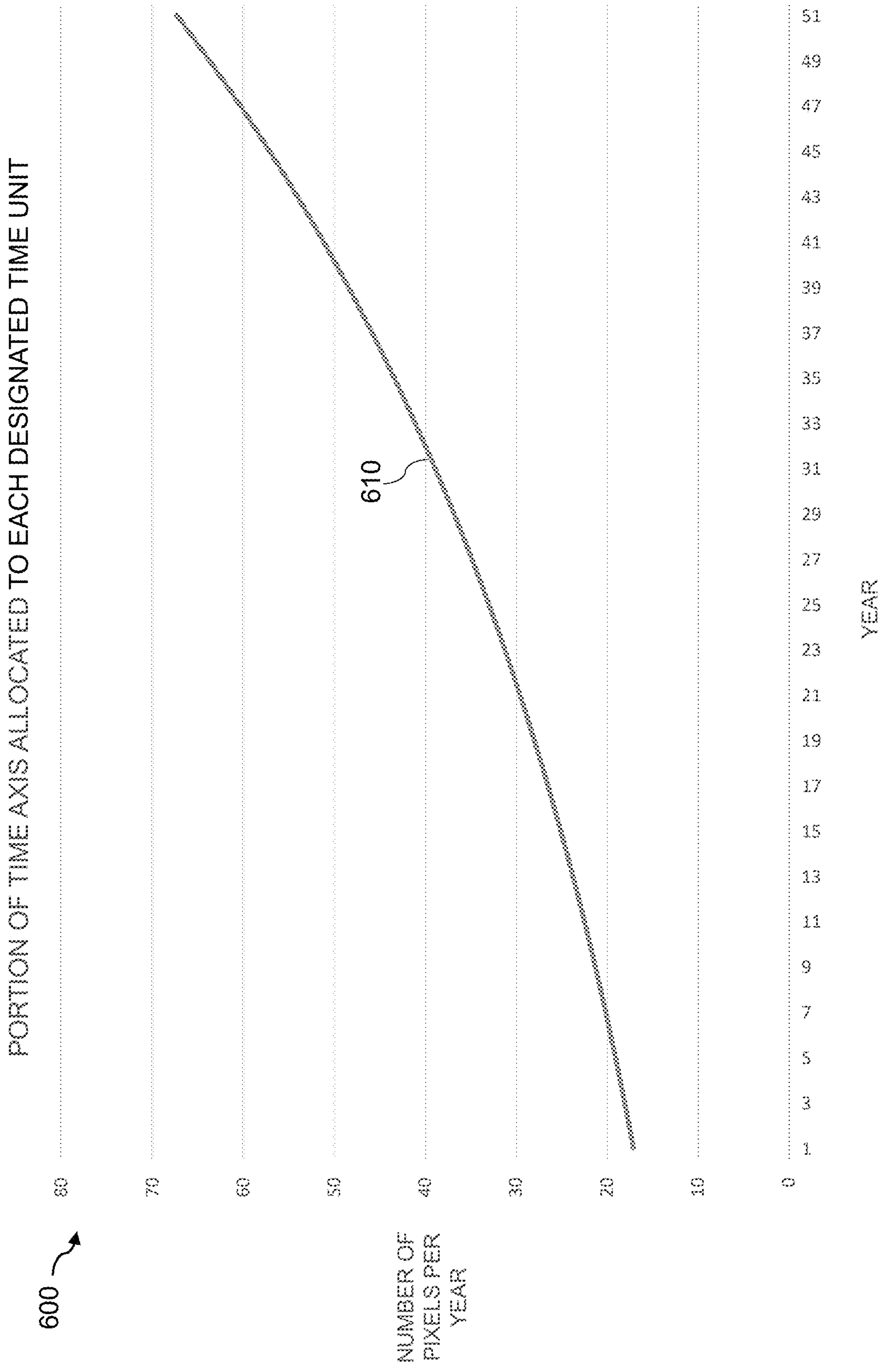
FIG. 6 illustrates an allocation of portions of a time axis to each designated time unit using a logarithmic time scale in an illustrative embodiment.

FIG. 6 illustrates an allocation of portions of a time axis to each designated time unit (e.g., one year) using a logarithmic time scale in an illustrative embodiment. In the example of FIG. 6, a graph 600 plots a number of pixels (y-axis) allocated for each year (x-axis) using a logarithmic curve 610 (e.g., a base-10 log scale). In this manner, the relevance of events over time may be visualized in some embodiments using the portion of the time axis allocated to each year based on the logarithmic curve 610. For example, events occurring in year 21 are assigned a width of approximately 30 pixels. Thus, in one or more embodiments, events associated with a more recent timeframe (e.g., more recent years) are allocated more visual space in a visualization than events associated with a less recent timeframe.

In this manner, more recent events, which may be more relevant in at least some implementations, are emphasized over less recent events (e.g., more recent events may be presented using a larger portion of a time axis, relative to less recent events). Likewise, less recent events, which may be of less importance in such implementations, are visually compressed relative to more recent events. Thus, a presentation of events may be weighted towards events that are more interesting and/or important to a viewer.

Figure 7:
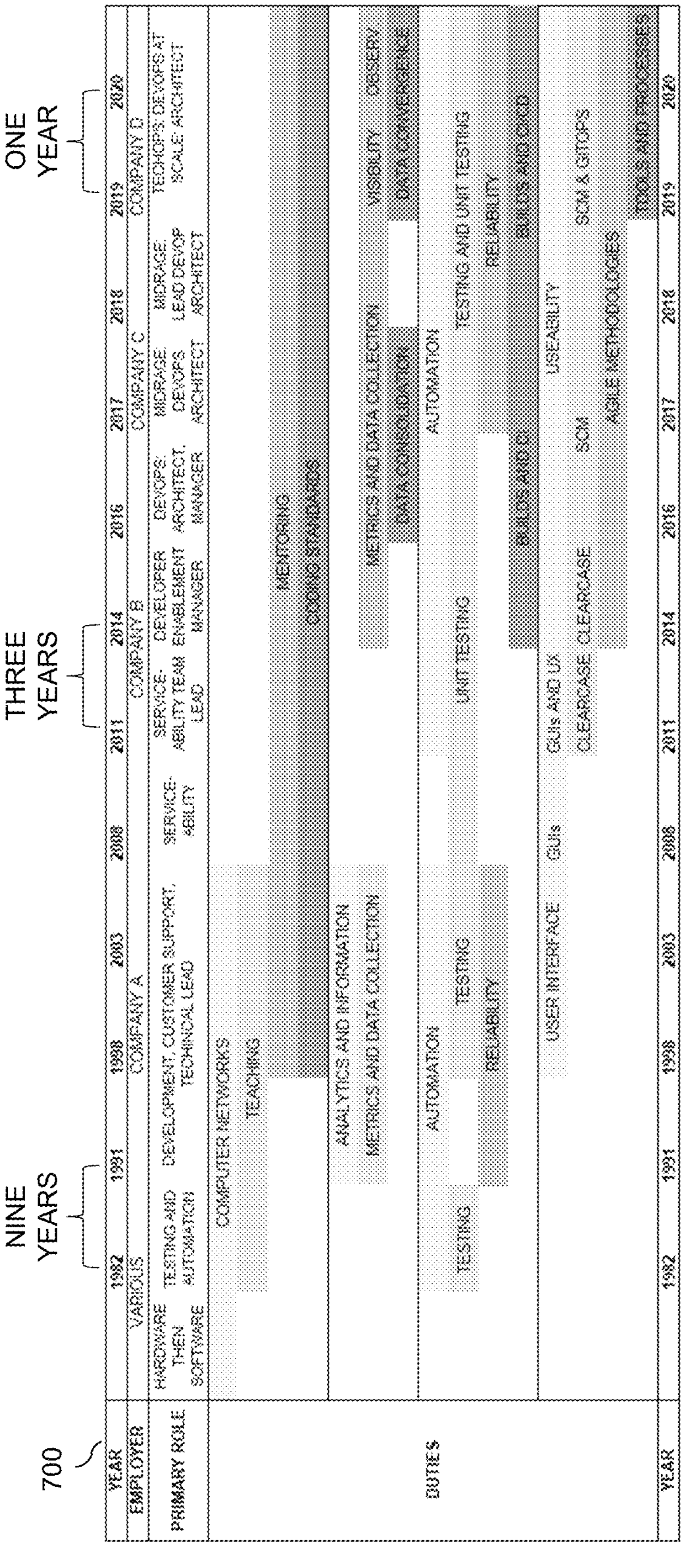
FIG. 7 illustrates an exemplary visualization of time-based events using a logarithmic time scale in an illustrative embodiment.

FIG. 7 illustrates an exemplary visualization 700 of time-based events using a logarithmic time scale in an illustrative embodiment. In the example of FIG. 7, multiple time-based event data structures, associated with an exemplary user work history, have been converted into a tabular format using the techniques of FIGS. 3 through 5. In addition, the fields of the table are normalized using a portion (e.g., in pixels) of the overall time duration allocated to each designated time unit (e.g., each year) with the logarithmic curve 610 of FIG. 6. Thus, one or more more recent events on the right side of the visualization 700 are presented using the designated time period (e.g., one year), events occurring in the middle portion of the visualization 700 are presented using multiple designated time periods (e.g., three years) in the same time span used to represent the first year, and the number of years presented in each designed time span unit increases with age, such that events occurring in the left portion of the visualization 700 are presented using even more designated time periods (e.g., nine years) visually compressed in the same amount of space used to represent the first year.

As noted above, more recent events, which may be more relevant in at least some implementations, are emphasized over less recent events in the visualization 700 (e.g., more recent events on the right side of the visualization 700 may be presented using a larger portion of the time axis, relative to less recent events on the left side of the visualization 700). Likewise, less recent events, which may be of less importance in such implementations, are visually compressed in the visualization 700 relative to more recent events. Thus, a focus of the events in the visualization 700 is weighted towards events that are more recent and likely more interesting and/or important to a viewer.

Figure 8:
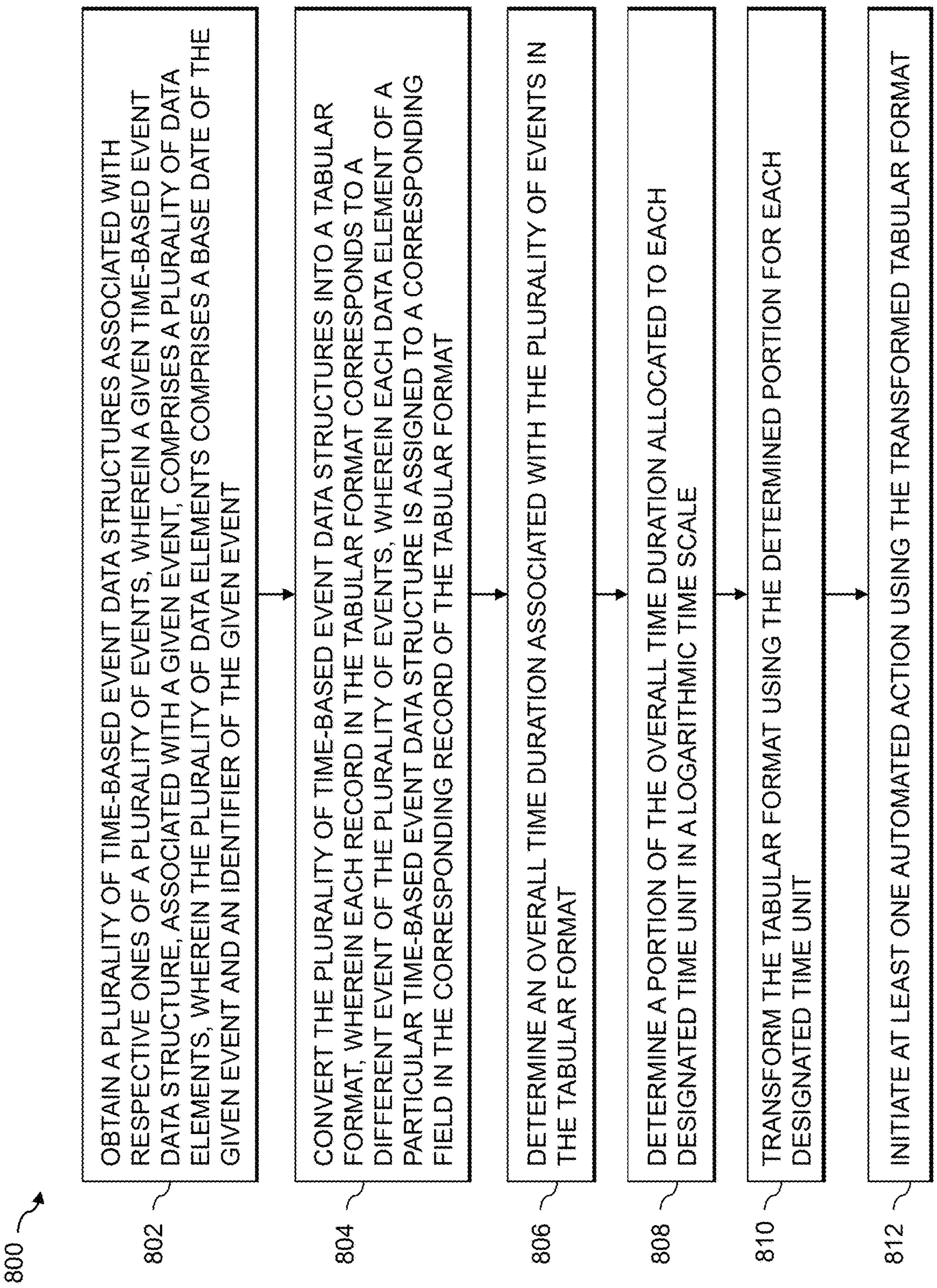
FIG. 8 is a flow diagram illustrating an exemplary implementation of a process for transformation of time-based event data structures to a logarithmic time scale, according to an embodiment.

FIG. 8 is a flow diagram illustrating an exemplary implementation of a process 800 for transformation of time-based event data structures to a logarithmic time scale, according to an embodiment. In the example of FIG. 8, a plurality of time-based event data structures associated with respective ones of a plurality of events is obtained in step 802, where a given time-based event data structure, associated with a given event, comprises a plurality of data elements, wherein the plurality of data elements comprises a base date of the given event and an identifier of the given event.

The plurality of time-based event data structures is converted in step 804 into a tabular format, wherein each record in the tabular format corresponds to a different event of the plurality of events, wherein each data element of a particular time-based event data structure is assigned to a corresponding field in the corresponding record of the tabular format.

An overall time duration associated with the plurality of events in the tabular format is determined in step 806, and a portion of the overall time duration allocated to each designated time unit in a logarithmic time scale is determined in step 808.

In step 810, the tabular format is transformed using the determined portion for each designated time unit. At least one automated action is initiated in step 812 using the transformed tabular format.

In at least one embodiment, the plurality of data elements of one or more time-based event data structures may further comprise one or more sub-event data elements corresponding to one or more sub-events within a duration of the respective event, and wherein the one or more sub-event data elements are assigned to corresponding additional fields in the corresponding record of the tabular format.

In some embodiments, one or more duplicate records are inserted in the tabular format for one or more of the events, where each record corresponds to the designated time unit, such that a time associated with a total number of records for a particular event corresponds to a duration of the particular event. The tabular format may be transposed such that each field in the transposed tabular format represents a duration corresponding to the designated time unit and each record in the transposed tabular format represents a corresponding data element of a corresponding time-based event data structure. The transforming the tabular format using the determined portion for each designated time unit may comprise adjusting a size of one or more fields in a visualization of the transposed tabular format using the determined portion for each designated time unit. The transforming the tabular format using the determined portion for each designated time unit may comprise calculating a size of each field in the transposed tabular format.

In one or more embodiments, the at least one automated action may comprise generating one or more notifications related to the transformed tabular format (such as sending an alert or another communication regarding the transformed tabular format to one or more designated recipients); generating one or more signals related to the transformed tabular format (for example, alerting another system of an availability of the transformed tabular format, providing the transformed tabular format to a display system and/or enabling a display of the transformed tabular format); and/or controlling a performance of at least one action in another system using the transformed tabular format (such as uploading the transformed tabular format in the other system or otherwise storing the transformed tabular format in the other system and/or initiating an automated review of the transformed tabular format by the other system).

The particular processing operations and other network functionality described in conjunction with FIGS. 3 through 5 and 8, for example, are presented by way of illustrative example only, and should not be construed as limiting the scope of the disclosure in any way. Alternative embodiments can use other types of processing operations to provide functionality for transformation of time-based event data structures to a logarithmic time scale. For example, the ordering of the process steps may be varied in other embodiments, or certain steps may be performed concurrently with one another rather than serially. In one aspect, the process can skip one or more of the process steps. In other aspects, two or more of the process steps can be performed simultaneously. In some aspects, additional process steps can be performed.

In at least some embodiments, the disclosed techniques for transformation of time-based event data structures to a logarithmic time scale assign a greater visual weight towards events that are more recent and likely more interesting and/or important to a viewer. Among other benefits, the disclosed logarithmic time scale transformation techniques improve the automated processing and display of historical time-based data, as well as an operation of a computing device with improved efficiency with respect to time-based data by using a logarithmic time scale.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for transformation of time-based event data structures to a logarithmic time scale will now be described in greater detail with reference to FIGS. 9 and 10. Although described in the context of information processing system 100, these platforms may also be used to implement at least portions of other information processing systems in other embodiments.

Figure 9:
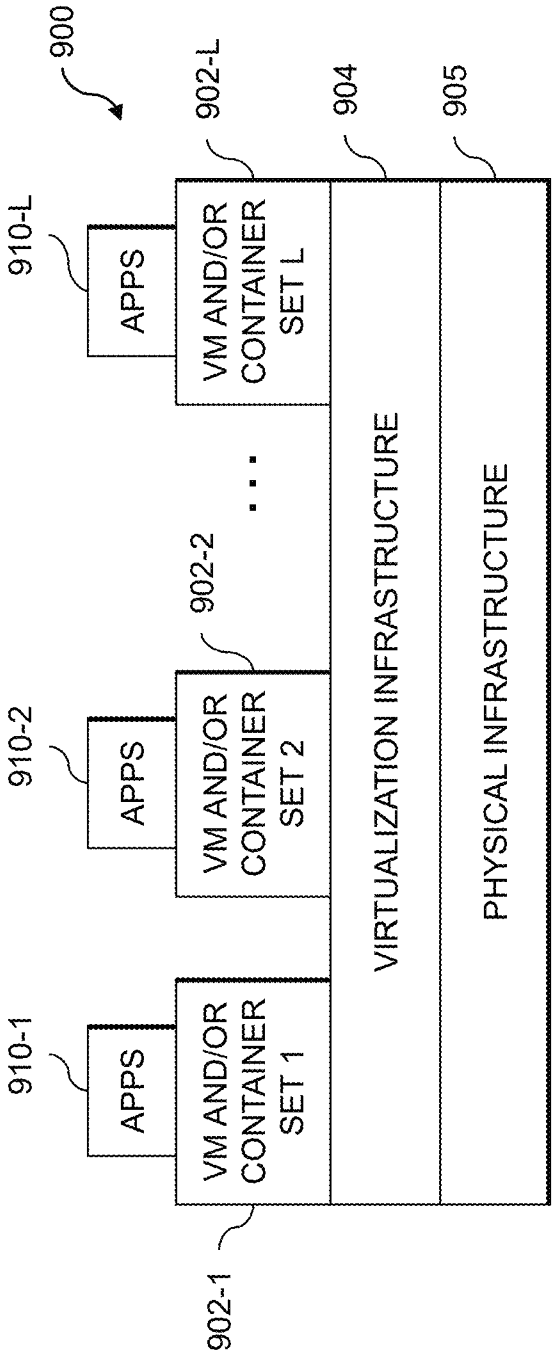
FIGS. 9 and 10 show examples of processing platforms that may be utilized to implement at least a portion of an information processing system in illustrative embodiments.
Figure 10:
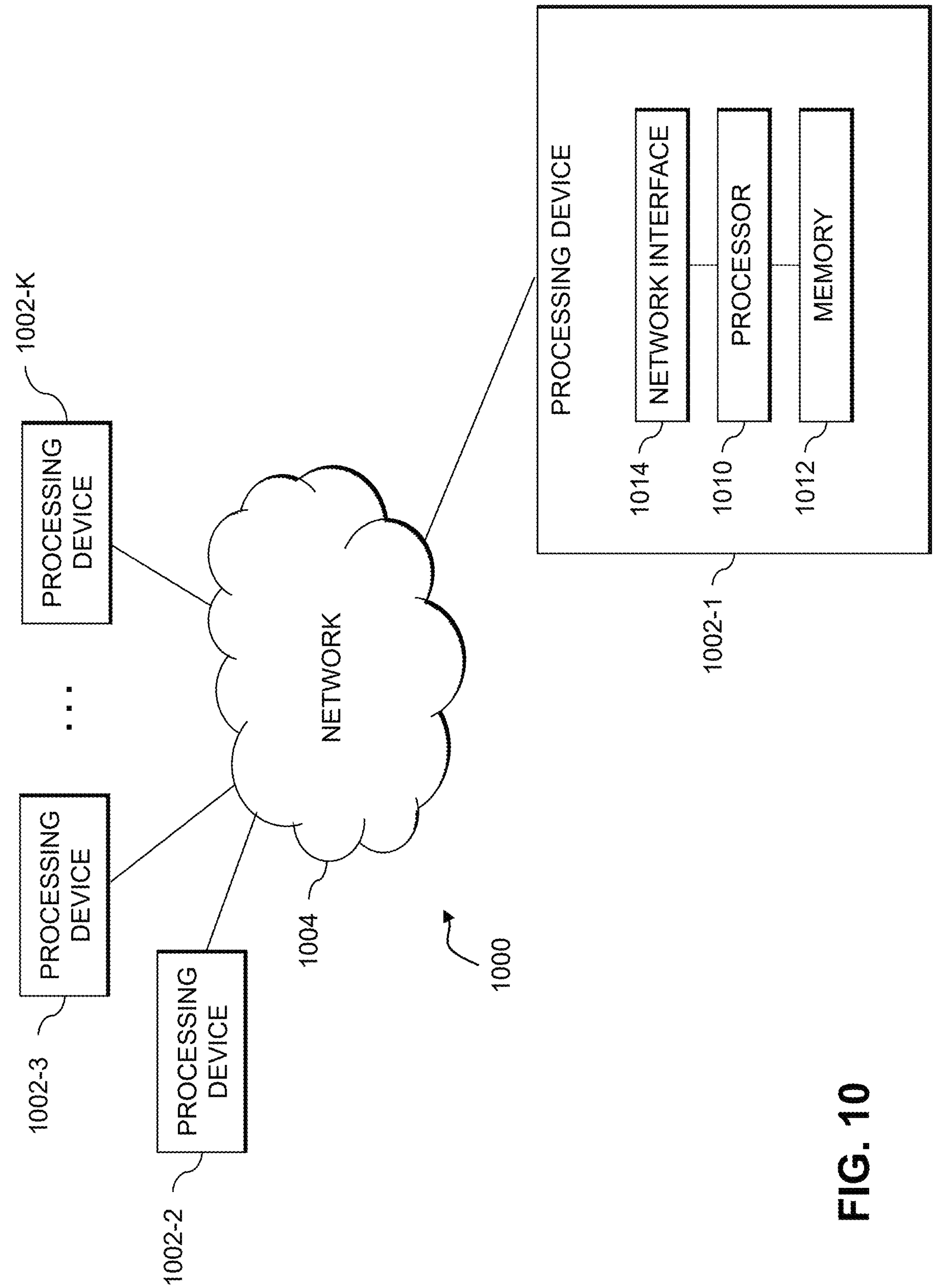

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of information processing system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for transformation of time-based event data structures to a logarithmic time scale as disclosed herein are illustratively implemented in the form of software running on one or more processing devices.

It should again be emphasized that the above-described embodiments are presented for purposes of illustration only. Many variations and other alternative embodiments may be used. For example, the disclosed logarithmic time scale transformation techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

accessing a plurality of time-based event data structures associated with respective ones of a plurality of events, wherein a given time-based event data structure, associated with a given event, comprises a plurality of data elements, wherein the plurality of data elements comprises a base date of the given event and an identifier of the given event;

converting the plurality of time-based event data structures into a tabular format, wherein each record in the tabular format corresponds to a different event of the plurality of events, wherein each data element of a particular time-based event data structure is assigned to a corresponding field in the corresponding record of the tabular format;

determining an overall time duration associated with the plurality of events in the tabular format;

determining a portion of the overall time duration allocated to each designated time unit in a logarithmic time scale, wherein the overall time duration for a given event begins at a starting time of the given event and ends at an ending time of the given event;

transforming the tabular format using the determined portion for each designated time unit; and initiating at least one automated action using the transformed tabular format;

wherein the method is performed by at least one processing device comprising a processor coupled to a memory.

2. The method of claim 1, wherein the plurality of data elements of one or more time-based event data structures further comprises one or more sub-event data elements corresponding to one or more sub-events within a duration of the respective event, and wherein the one or more sub-event data elements are assigned to corresponding additional fields in the corresponding record of the tabular format.

3. The method of claim 1, further comprising inserting one or more duplicate records for one or more of the events in the tabular format, wherein each record corresponds to the designated time unit, such that a time associated with a total number of records for a particular event corresponds to a duration of the particular event.

4. The method of claim 3, further comprising transposing the tabular format such that each field in the transposed tabular format represents a duration corresponding to the designated time unit and each record in the transposed tabular format represents a corresponding data element of a corresponding time-based event data structure.

5. The method of claim 4, wherein the transforming the tabular format using the determined portion for each designated time unit comprises adjusting a size of one or more fields in a visualization of the transposed tabular format using the determined portion for each designated time unit.

6. The method of claim 4, wherein the transforming the tabular format using the determined portion for each designated time unit comprises calculating a size of each field in the transposed tabular format.

7. The method of claim 1, wherein the at least one automated action comprises one or more of generating one or more notifications related to the transformed tabular format; generating one or more signals related to the transformed tabular format; and controlling a performance of at least one action in another system using the transformed tabular format.

8. An apparatus comprising:

at least one processing device comprising a processor coupled to a memory;

the at least one processing device being configured to implement the following steps:

accessing a plurality of time-based event data structures associated with respective ones of a plurality of events, wherein a given time-based event data structure, associated with a given event, comprises a plurality of data elements, wherein the plurality of data elements comprises a base date of the given event and an identifier of the given event;

converting the plurality of time-based event data structures into a tabular format, wherein each record in the tabular format corresponds to a different event of the plurality of events, wherein each data element of a particular time-based event data structure is assigned to a corresponding field in the corresponding record of the tabular format;

determining an overall time duration associated with the plurality of events in the tabular format, wherein the overall time duration for a given event begins at a starting time of the given event and ends at an ending time of the given event;

determining a portion of the overall time duration allocated to each designated time unit in a logarithmic time scale;

transforming the tabular format using the determined portion for each designated time unit; and initiating at least one automated action using the transformed tabular format.

9. The apparatus of claim 8, wherein the plurality of data elements of one or more time-based event data structures further comprises one or more sub-event data elements corresponding to one or more sub-events within a duration of the respective event, and wherein the one or more sub-event data elements are assigned to corresponding additional fields in the corresponding record of the tabular format.

10. The apparatus of claim 8, further comprising inserting one or more duplicate records for one or more of the events in the tabular format, wherein each record corresponds to the designated time unit, such that a time associated with a total number of records for a particular event corresponds to a duration of the particular event.

11. The apparatus of claim 10, further comprising transposing the tabular format such that each field in the transposed tabular format represents a duration corresponding to the designated time unit and each record in the transposed tabular format represents a corresponding data element of a corresponding time-based event data structure.

12. The apparatus of claim 11, wherein the transforming the tabular format using the determined portion for each designated time unit comprises adjusting a size of one or more fields in a visualization of the transposed tabular format using the determined portion for each designated time unit.

13. The apparatus of claim 11, wherein the transforming the tabular format using the determined portion for each designated time unit comprises calculating a size of each field in the transposed tabular format.

14. The apparatus of claim 8, wherein the at least one automated action comprises one or more of generating one or more notifications related to the transformed tabular format; generating one or more signals related to the transformed tabular format; and controlling a performance of at least one action in another system using the transformed tabular format.

15. A non-transitory processor-readable storage medium having stored therein program code of one or more software programs, wherein the program code when executed by at least one processing device causes the at least one processing device to perform the following steps:

accessing a plurality of time-based event data structures associated with respective ones of a plurality of events, wherein a given time-based event data structure, associated with a given event, comprises a plurality of data elements, wherein the plurality of data elements comprises a base date of the given event and an identifier of the given event;

converting the plurality of time-based event data structures into a tabular format, wherein each record in the tabular format corresponds to a different event of the plurality of events, wherein each data element of a particular time-based event data structure is assigned to a corresponding field in the corresponding record of the tabular format;

determining an overall time duration associated with the plurality of events in the tabular format, wherein the overall time duration for a given event begins at a starting time of the given event and ends at an ending time of the given event;

determining a portion of the overall time duration allocated to each designated time unit in a logarithmic time scale;

transforming the tabular format using the determined portion for each designated time unit; and initiating at least one automated action using the transformed tabular format.

16. The non-transitory processor-readable storage medium of claim 15, wherein the plurality of data elements of one or more time-based event data structures further comprises one or more sub-event data elements corresponding to one or more sub-events within a duration of the respective event, and wherein the one or more sub-event data elements are assigned to corresponding additional fields in the corresponding record of the tabular format.

17. The non-transitory processor-readable storage medium of claim 15, further comprising inserting one or more duplicate records for one or more of the events in the tabular format, wherein each record corresponds to the designated time unit, such that a time associated with a total number of records for a particular event corresponds to a duration of the particular event.

18. The non-transitory processor-readable storage medium of claim 17, further comprising transposing the tabular format such that each field in the transposed tabular format represents a duration corresponding to the designated time unit and each record in the transposed tabular format represents a corresponding data element of a corresponding time-based event data structure.

19. The non-transitory processor-readable storage medium of claim 18, wherein the transforming the tabular format using the determined portion for each designated time unit comprises adjusting a size of one or more fields in a visualization of the transposed tabular format using the determined portion for each designated time unit.

20. The non-transitory processor-readable storage medium of claim 15, wherein the at least one automated action comprises one or more of generating one or more notifications related to the transformed tabular format; generating one or more signals related to the transformed tabular format; and controlling a performance of at least one action in another system using the transformed tabular format.

* * * * *